FREQUENCY KEYED TRANSISTOR OSCILLATOR SIGNAL RECEIVER

Filed Feb. 21, 1961 2 Sheets-Sheet 1

INVENTOR.
JAMES A. BLAKE
BY Gust & Irish
ATTORNEYS

FREQUENCY KEYED TRANSISTOR OSCILLATOR SIGNAL RECEIVER

Filed Feb. 21, 1961 2 Sheets-Sheet 2

INVENTOR.
JAMES A. BLAKE
BY Gust + Irish
ATTORNEYS

United States Patent Office 3,248,722 Patented Apr. 26, 1966

3,248,722
FREQUENCY KEYED TRANSISTOR OSCILLATOR SIGNAL RECEIVER

James A. Blake, Hamilton Square, N.J., assignor, by mesne assignments, to Hood, Gust & Irish, Fort Wayne, Ind., a partnership Filed Feb. 21, 1961, Ser. No. 90,721
3 Claims. (Cl. 340—311)

The present invention relates to a signalling circuit and more particularly to a circuit useful in pocket size, personal communications receivers.

Radio-calling service is presently available on a commercial basis and is becoming increasingly popular for the reason that it is capable of signalling an individual regardless of his location, provided he is within the transmitting range of the central-station. The equipment used in providing this service is unilateral in its operation, meaning that radio transmissions are one-way from a central-transmitting station to a pocket-size receiver carried by an individual. In operation, if it is desired to reach the individual, the caller telephones the central-station over a wire system and identifies the individual sought and leaves a message for him. The operator thereupon sends out a coded radio transmission which actuates only the receiver of this individual, such actuation producing an audible sound in the form of a buzz or high frequency tone. Upon hearing this sound, the individual knows he is to call the central-station operator over the telephone, which he proceeds to do. The central-station operator then relays the message to him.

This equipment is so designed as to provide selective calling service to a multiplicity of receiving sets, these sets constantly monitoring the transmitting frequency and sounding an alarm whenever communication with the set user is desired.

The receiver carried by the individual normally comprises several transistorized circuits, designed for reliability and low power consumption, which in combination provide an economical, easily produced receiving unit. The receiver is small enough to fit into the user's coat or shirt pocket.

Receivers presently being used utilize an audio oscillator for signalling the owner, this oscillator being triggered into operation by a decoder which responds to a predetermined calling code transmitted by the central-station. A speaker or electro-acoustic device capable of producing an audible signal is directly connected to the oscillator such that when the latter is triggered into operation, a calling sound is produced. The speaker or electro-acoustic device is conventionally incorporated into the feedback loop of the oscillator, and it has been discovered that since almost all such devices are bilateral in nature, they tend to generate an electrical signal when excited by either an audio signal or physical shock. This electrical signal too often triggers the oscillator into operation, causing a false alarm to be given to the individual.

Further, the current receiver is capable of only producing an alarm or call signal, it therefore being impossible to convey any further information or intelligence to the user.

The present invention is unique in the respect that it eliminates these mentioned deficiencies in the respect of preventing false alarms and is not only capable of producing a call signal but also of giving to the user a voice message or the like at the same time.

It is therefore an object of this invention to provide circuitry for use in receivers of the type just discussed whereby the generation of false alarms is prevented.

Another object of this invention is to provide means in a paging receiver of not only alerting the user that a message is available for him, but also giving him the message immediately following the alarm.

The above-mentioned and other features and objects of this invention and the manner of attaining them will become more apparent and the invention itself will be best understood by reference to the following description of an embodiment of the invention taken in conjunction with the accompanying drawing, wherein.

Figure 1:
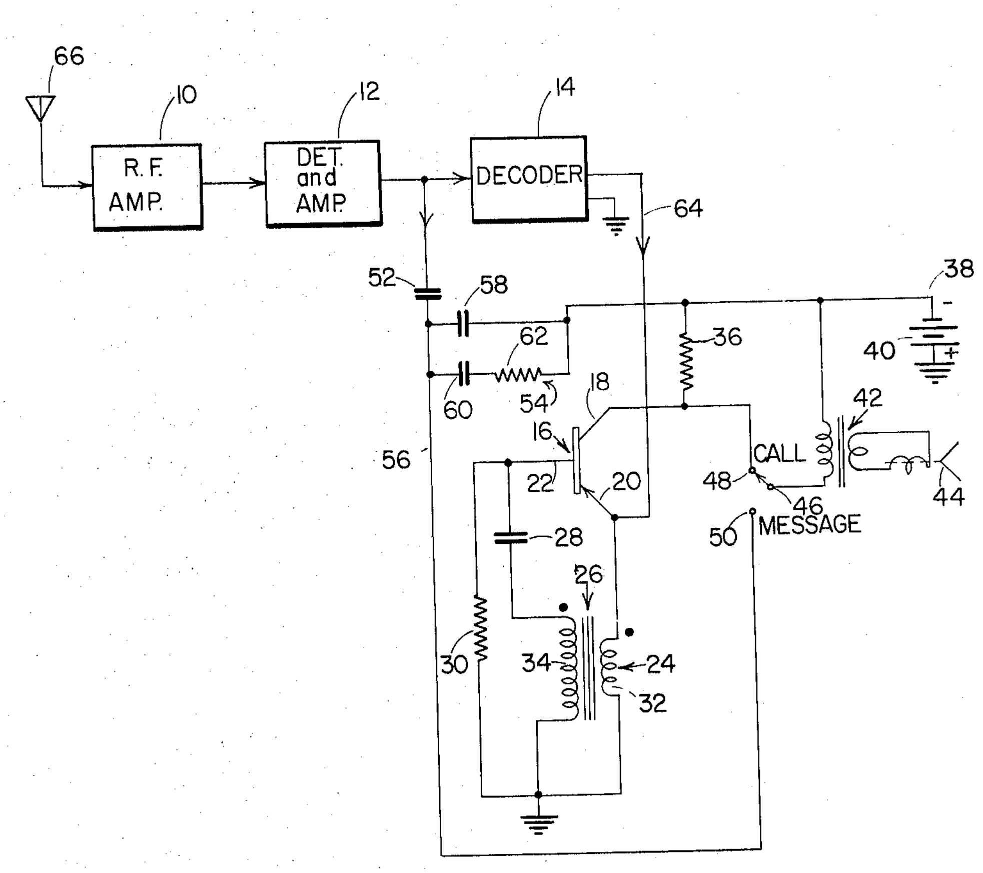
FIG. 1 is a circuit diagram of one embodiment of this invention.

Referring to the drawing, the radio paging receiver of the type contemplated by this invention is illustrated partially in block diagram and partially schematically. Those portions illustrated in the blocks are conventional, block 10 representing a radio frequency amplifier, block 12 a detector and audio amplifier, and block 14 decoding circuitry which is capable of emitting a signal or voltage pulse in response to a particular, characteristic, electrical signal coupled thereto.

The oscillator and audio-signalling portions of the receiver are schematically illustrated and comprise a transistor 16 having collector, emitter and base elements 18, 20, and 22, respectively. A regenerative feedback network indicated generally by the reference numeral 24 is connected between the emitter and base elements 20, 22, and include a transformer 26, a capacitor 28, and a leak resistor 30. The primary 32 of the transformer 26 is connected in series between the emitter 20 and "ground," the word "ground" being used in the sense of meaning a common bus-bar or the like connection. The secondary 34 is connected in series between the capacitor 28 and ground, the remaining lead of the capacitor being connected directly to the base element 22. The resistor 30 is directly connected between the base 22 and ground, as shown.

A supply resistor 36 is connected between the collector element 18 and the negative terminal 38 of a battery 40, the positive terminal in this battery being grounded.

An output transformer, generally indicated by the numeral 42, has its secondary winding connected to the voice coil of an ordinary speaker 44 and its primary winding series-connected between the battery terminal 38 and the arm 46 of a single-pole, double-throw switch which normally is biased to its illustrated position. One of the switch contacts 48 is directly connected to the collector element 18 while the remaining contact 50 is coupled to the output circuit of the detector and amplifier 12 by means of a capacitor 52. A code signal filtering network, indicated generally by the numeral 54, is connected between the coupling line 56 and the battery terminal 38, this network 54 including a capacitor 58 which is shunt-connected across another capacitor 60 and a resistor 62 connected in series.

A line 65 connects the output circuit of decoder 14 to the emitter element 20 of the transistor.

In operation, an amplitude modulated signal is intercepted by the antenna 66, is amplified, demodulated and further amplified by the circuits indicated by the numerals 10 and 12, respectively. The carrier intercepted by the antenna 66 is normally tone-modulated, this modulation being coded in the form of one or more bursts of audio frequency tone, usually three bursts, which may be of different frequencies. These bursts usually have a duration of about one-half second and occur in rapid sequence. Different receivers are preadjusted to respond to only a single code or set of three bursts, such that only a single receiver will produce an alarm in response to a given code signal.

Since the receiver must discriminate between different codes, a decoder 14 is used which may be conventional in design. One conventional decoder comprises three reeds having resonant frequencies, respectively, which correspond to the various tones contained in the code group. When the proper code is applied to the decoder, all of these reeds are set into vibration, which results in the generation of a voltage pulse. This voltage pulse is coupled by the line 64 to the emitter 20 of the transistor.

The transistor 16 in the oscillator is normally cut-off. When a trigger pulse is received from the decoder 14 via the line 64, a transient or disturbance is coupled into the emitter winding 32 of the transformer 24. This transient causes some small current to flow in the base-emitter junction. The connections on the transformer 24 to the emitter and base are polarized regeneratively such that oscillation rapidly builds to operating level. All current for oscillation flows through the collector load 42 for actuating the speaker 44. Thus, when the oscillator is set into operation, the speaker 44 will produce an audible sound.

Of particular importance is the fact that the speaker transformer 42 is located in the collector circuit of the oscillator. The speaker is thus located outside of the feedback loop 24 which is coupled between the emitter and base elements 20 and 22, respectively. A change in collector voltage, therefore, does not cause a change in emitter current. However, a change in emitter current does cause a change in collector voltage. Physical shocks from the speaker 44 which might induce a voltage in the transformer 42 therefore cannot set the oscillator into operation. The system thereby becomes unilateral as contrasted with the prior art bilateral system wherein accidental triggering of the oscillator could occur by merely subjecting the speaker to physical shock.

Recapitulating, the operation described thus far, when a coded signal is intercepted by the antenna 16, the normally quiescent oscillator is triggered into operation, thereby energizing the speaker 44. Upon hearing this sound, the user shifts the arm 46 of the single-pole, double-throw switch to the contact 50, thereby connecting the speaker transformer 42 directly to the output circuit of the detector-amplifier 12. The audio message which may be transmitted on the carrier immediately following the transmission of the code group is thereby coupled directly to the speaker 44 and is reproduced in audible form.

Thus, the user not only is alerted to the fact that a message is forthcoming, but is able to receive immediately the message.

Upon moving switch arm from contact 48 to contact 50, the oscillator ceases oscillation, because it becomes current starved due to the presence of resistor 36. The oscillator loop gain drops to a value which will not sustain oscillation, and the current through the transistor reduces to zero. The collector voltage becomes that of the battery terminal 38 voltage. The system is thus reset for the next triggering impulse from the decoder 14 which again triggers the oscillator into operation.

The invention thereby overcomes two principal defects found in prior art systems in the respect to preventing the development of false alarms and, secondly, providing means whereby the owner, or user, can receive the intended message immediately following the generation of the alarm signal.

In the following are listed typical values of the component parts used in the oscillator circuit. These values are given only as an exemplification of a working embodiment of the present invention and are not to be considered as limitative. It will obviously occur to persons skilled in the art that these values may be changed without departing from the scope of this invention.

| Reference numerals: | | Values |
|---|---|---|
| Transistor **16** | | (1) |
| Capacitor **28** | mfd | .05 |
| Resistor **30** | ohms | 820 |
| Resistor **36** | | 30K |
| Condenser **52** | mfd | .10 |
| Condenser **58** | mfd | .22 |
| Condenser **60** | mfd | .05 |
| Resistor **62** | | 2.2K |

[1] Any PNP—typical 2N43A.

Figure 2:
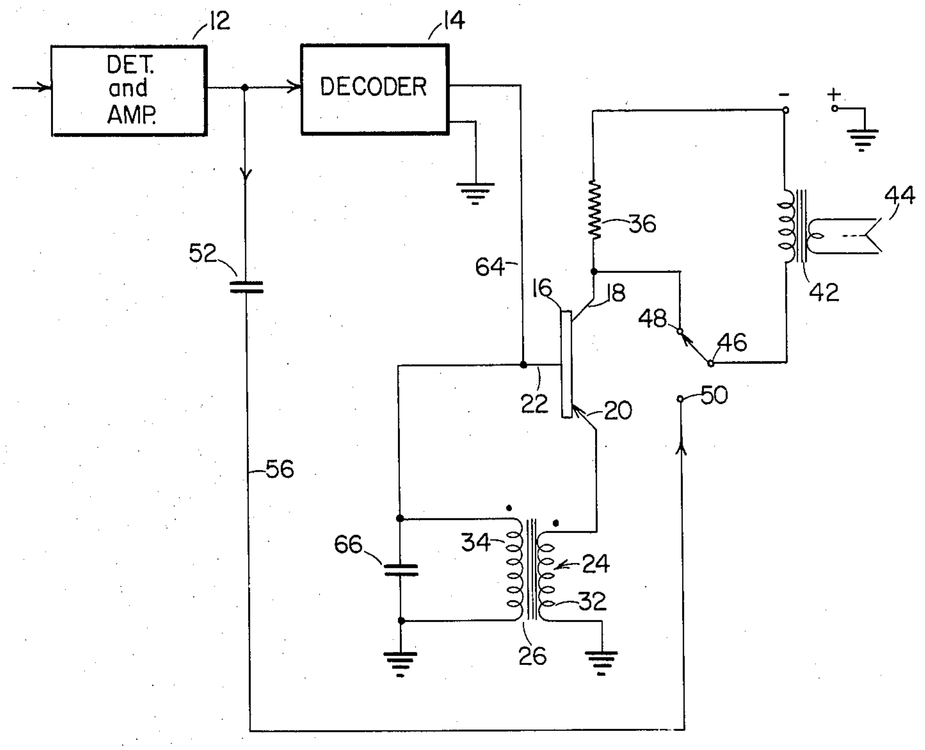
FIG. 2 is a circuit diagram of a second embodiment.

In FIG. 2 is illustrated the second embodiment of this invention wherein like numerals indicate like parts. This circuit is basically the same as that already described hereinbefore with the exception that the signal from the decoder 14 is coupled to the base 22 instead of to the emitter 20. This results in a simplification of the overall circuit by the elimination of the components as is apparent from a comparison of the two circuits of FIGS. 1 and 2 respectively. In the circuit of FIG. 2, the lower ends of the two windings 32 and 34 are connected together. The upper end of the winding 34, however, is connected directly to the base 22 while a capacitor 66 is shunt connected across the winding 34 as shown.

This circuit of FIG. 2 is simpler than that of FIG. 1 and is easier and more economical to produce in mass production quantities. The frequency of the oscillator is primarily determined by the saturation of the transformer 26 core which is a predictable characteristic. The capacitor 66 in shunt with the secondary winding 34 serves in tuning the circuit resonance and assists in stabilizing the frequency of oscillation.

The oscillator is triggered into oscillation by the signal from the decoder 14 being applied directly to the base 22. Experiments have shown that improved sensitivity in triggering the oscillator into operation is achieved by applying the decoding signal to the base. Otherwise, this circuit functions the same as that of FIG. 1.

In an operative example of the circuit of FIG. 2, the component values are the same as those already listed in connection with the circuit of FIG. 1. The only exception to this resides in the value of the capacitor 66 which may be .01 mfd. Other values of these components may be used without departing from the scope of this invention as is obvious to a person skilled in the art.

While I have described above the principles of my invention in connection with specific apparatus, it is to be clearly understood that this description is made only by way of example and not as a limitation to the scope of my invention.

What is claimed is:

1. In combination, a source of signals, an oscillator responsive to said signals and coupled to said source, said oscillator comprising a transistor having base, emitter and collector elements, a feedback transformer having primary and secondary windings, said primary winding connected in series between said emitter element and ground, a capacitor series-connected between said base element and one end of said secondary winding, the other end of said secondary winding being connected to ground, a leak resistor connected between said base element and ground, two power supply terminals, a dropping resistor series-connected between one terminal and said collector element, the other terminal being grounded, an output transformer having primary and secondary windings, the primary winding of the last-mentioned transformer being series-connected between said one terminal and said collector element, a speaker coupled to the secondary winding of said last-mentioned transformer, and means coupling said source to said emitter element for applying said signals thereto, said transistor being biased to cut-off and the first-mentioned transformer being regeneratively coupled between said emitter and base elements, whereby a signal from said source triggers said oscillator into operation which in turn actuates said speaker.

2. The combination of claim 1 including a decoding circuit interposed in series between said source and said emitter element, said decoding circuit generating a code-signal only in response to a predetermined signal from said source, whereby said oscillator is triggered into operation only in response to said code signal, a single-pole double-throw switch having two fixed contacts and a switch arm, the switch arm and one contact being connected in series between said collector element and the primary winding of said output transformer, the other contact being coupled to said source whereby said speaker may be selectively switched between said oscillator and said source.

3. The combination of claim 1 including a decoding circuit interposed in series between said source and said emitter element, said decoding circuit generating a code-signal only in response to a predetermined signal from said source, whereby said oscillator is triggered into operation only in response to said code signal, a single-pole double-throw switch having two fixed contacts and a switch arm, the switch arm and one contact being connected in series between said collector element and the primary winding of said output transformer, the other contact being coupled to said source whereby said speaker may be selectively switched between said oscillator and said source, and a code signal-filtering network connected between said other contact and said one power supply terminal for filtering the code signal from said source when said speaker is directly coupled thereto.

References Cited by the Examiner

UNITED STATES PATENTS

| | | | |
|---|---|---|---|
| 2,899,547 | 8/1959 | Crow et al. | 340—311 X |
| 2,951,910 | 9/1960 | Bauman | 331—112 X |
| 3,072,862 | 1/1963 | Semeria | 331—117 |
| 3,090,013 | 5/1963 | Scantlin et al. | 340—311 X |

FOREIGN PATENTS

| | | |
|---|---|---|
| 226,427 | 4/1958 | Australia. |
| 1,233,409 | 10/1960 | France. |
| 1,087,180 | 8/1960 | Germany. |

NEIL C. READ, *Primary Examiner.*

IRVING L. SRAGOW, *Examiner.*